(12) United States Patent
Mao et al.

(10) Patent No.: US 6,771,001 B2
(45) Date of Patent: Aug. 3, 2004

(54) BI-STABLE ELECTROSTATIC COMB DRIVE WITH AUTOMATIC BRAKING

(75) Inventors: Minyao Mao, Santa Rosa, CA (US); Donald M. Friedrich, Santa Rosa, CA (US); Markus Duelli, Santa Rosa, CA (US); Bryant Hichwa, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/810,825

(22) Filed: Mar. 16, 2001

(65) Prior Publication Data

US 2002/0130586 A1 Sep. 19, 2002

(51) Int. Cl.[7] .................................................. H02N 1/00
(52) U.S. Cl. ...................................... 310/309; 200/181
(58) Field of Search ....................... 310/309; 360/294.4, 360/294.5; 385/15.18; 200/181; 73/504.12, 514.32

(56) References Cited

U.S. PATENT DOCUMENTS

| | | | |
|---|---|---|---|
| 3,769,531 A | * 10/1973 | Elkuch | 310/6 |
| 5,025,346 A | 6/1991 | Tang et al. | 361/283 |
| 5,428,259 A | * 6/1995 | Suzuki | 310/309 |
| 5,519,240 A | 4/1996 | Suzuki | 257/315 |
| 5,594,820 A | 1/1997 | Garel-Jones et al. | 385/22 |

(List continued on next page.)

FOREIGN PATENT DOCUMENTS

| | | | |
|---|---|---|---|
| DE | 3644802 | 7/1988 | |
| EP | 0 880 040 | 5/1997 | |
| EP | 1 004 910 | 11/1999 | |
| JP | 6-148536 | 5/1994 | |
| JP | 2000-266777 | * 9/2000 | G01P/15/125 |
| WO | WO 98/12589 | 3/1998 | |

OTHER PUBLICATIONS

Ye et al., "Optmial Shape Design of an Electrostatic Comb Drive in Micromechanical Systems", Journal of Microelectromechanical Systems; vol. 7, No. 1, Mar. 1998, pp. 16–26.*

Jensen et al., "Shaped Comb Fingers for Tailored Electromechanical Restoring Force", Journal of Microelectromechanical Systems, vol. 12, No. 3, Jun. 2003, p. 373–383.*

U.S. patent application Ser. No. 09/517,913, Hichwa et al. filed Mar. 3, 2000.

Marxer and de Rooij, Micro–Opto–Mechanical 2X2 Switch For Single–Mode Fibers Based on Plasma–Etched Silicon Mirror and Electrostatic Actuation, IEEE J. of Lightwave Technology, vol. 17, No. 1, 2–8 (Jan. 1999).

Lee et al., Bi–Stable Planar Polysilicon Microactuators with Shallow Arch–Shaped Leaf Springs, SPIE Conference on Micromachined Devices and Components V, 274–279 (Sep. 1999), Santa Clara, California.

Chen et al., A High–Speed Low–Voltage Stress–Induced Micromachined 2X2 Optical Switch, IEEE Photonics Technology Letters, vol. 11, No. 11, 1396–1398 (Nov. 1999).

*Primary Examiner*—Karl Tamai

(57) ABSTRACT

An electrostatic comb drive suitable for micro-electro-mechanical systems ("MEMS") application uses shaped fingers to achieve bi-directional actuation from a unipolar actuation pulse. The finger shape also provides auto-braking of the movable member of the drive using a simple actuating pulse. In a further embodiment, an end stop inhibits overshoot and a back spring pushes the movable portion of the device back toward an operating position. In yet a further embodiment, a Vernier scale is provided on the movable portion of the drive relative to the fixed portion of the drive to indicate relative shift of these portions after the device is fabricated.

19 Claims, 11 Drawing Sheets

U.S. PATENT DOCUMENTS

| | | | |
|---|---|---|---|
| 5,629,565 A | 5/1997 | Schlaak et al. | 257/780 |
| 5,808,384 A | 9/1998 | Tabat et al. | 310/40 |
| 5,909,078 A | 6/1999 | Wood et al. | 310/307 |
| 5,914,553 A * | 6/1999 | Adams et al. | 310/309 |
| 5,923,798 A | 7/1999 | Aksyuk et al. | 385/19 |
| 5,943,454 A | 8/1999 | Aksyuk et al. | 385/22 |
| 5,955,817 A | 9/1999 | Dhuler et al. | 310/307 |
| 5,994,816 A | 11/1999 | Dhuler et al. | 310/307 |
| 5,995,688 A | 11/1999 | Aksyuk et al. | 385/14 |
| 5,998,906 A | 12/1999 | Jerman et al. | 310/309 |
| 6,000,280 A * | 12/1999 | Miller et al. | 73/105 |
| 6,046,659 A | 4/2000 | Loo et al. | 333/262 |
| 6,058,027 A | 5/2000 | Vargha et al. | 363/33 |
| 6,160,230 A | 12/2000 | McMillan et al. | 200/181 |
| 6,229,683 B1 | 5/2001 | Goodwin-Johansson | 361/233 |
| 6,303,885 B1 | 10/2001 | Hichwa et al. | 200/181 |
| 6,307,298 B1 * | 10/2001 | O'Brien | 310/309 |
| 6,351,201 B1 | 2/2002 | Foster | 335/220 |
| 6,360,033 B1 * | 3/2002 | Lee et al. | 385/18 |
| 6,388,359 B1 | 5/2002 | Duelli et al. | 310/309 |
| 2002/0013586 A1 * | 1/2002 | Mao et al. | 310/309 |

\* cited by examiner

BI-STABLE ELECTROSTATIC COMB DRIVE WITH AUTOMATIC BRAKING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to motors or drives for micro-electro-mechanical systems (MEMS) devices, and more particularly to inter-digitated electrostatic comb drives.

A variety of drives and motors have been developed for MEMS applications to actuate a variety of devices, such as electronic or fluid switches, or to move an object, such as a mirror or other optical device, from one position to another. For example, MEMS devices have been developed for use in optical switching applications in optical communication systems.

One such device uses a small mirror fabricated on a movable portion of a MEMS drive, the mirror being moved into and out of the path of an optical beam. When the mirror is out of the beam path, the optical beam continues to one destination, and when the mirror is in the beam path, the optical beam is reflected to another destination.

This device uses an electrostatic comb drive actuator with two separate comb drives attached to the movable element (mirror) of the device to achieve bi-directional operation. An example of a MEMS device with dual comb drives is illustrated and described in International Patent Publication No. WO 98/12589, entitled A FIBER OPTIC CIRCUIT SWITCH AND A PROCESS FOR ITS PRODUCTION by Anthamatten et al., published Mar. 26, 1998. One drive has a fixed set of fingers and a corresponding set of interdigitated movable fingers to pull the movable portion in one direction, and a second set of fixed and interdigitated movable fingers to pull the movable portion back in the opposite direction. The device can be cycled by applying an appropriate actuation signal first to one set of fingers, and then applying another actuation signal to the other drive. The device can be latched in either position by a variety of mechanisms, such as by using mechanical latches, magnetic latches, or electrostatic latches. Alternatively, the actuation signal may be continuously applied to retain the switch state of the device.

However, mechanical overshoot and ringing can occur due to the kinematics of the comb drive. For example, an actuating pulse of sufficient voltage and duration to switch the least compliant comb drive may cause the most compliant comb drive to overshoot the desired position due to the momentum of the movable elements. Such overshoot can cause a number of problems. For example, the momentum might cause the generally thin, fragile interdigitated fingers to crash into the opposite wall of the comb drive, or the movable element might first overshoot and then recoil back to the original position.

The mirror might overshoot past where it can reflect the optical beam, temporarily "dropping" the beam until the mirror settles into its correct position. This settling can require an additional period to be specified in the switching time of the device, which is generally undesirable. Such settling is often referred to as "ringing", as the device oscillates between one position and another in a decaying fashion. Some devices use a fluid, such as a heavy gas, pressurized gas, or liquid, to damp the ringing more quickly; however these fluids complicate packaging of the device and may be unwanted or even prohibited in some commercial applications because of the change in performance or damage to other devices if the fluid leaks out. In a latching electrostatic comb drive system, overshoot of the movable portion of the device might even cause the movable portion, after overshooting the desired position, to spring back to latch in the initial position.

Another technique used to reduce overshoot and ringing is to apply an acceleration pulse to the comb drive to initiate motion of the movable portion in the desired direction, and then to apply a breaking pulse to the opposing comb drive (in a two-drive system) to decelerate the movable portion. Such a technique is described in copending co-assigned U.S. patent application Ser. No. 09/517,913 entitled METHOD OF ACTUATING MEMS SWITCHES by Hichwa et al., filed Mar. 3, 2000. The braking pulse helps to remove some of the kinetic energy from the system. While effective, the voltages, duration, and timing of the two pulses must be determined and reliably provided.

Thus, an electrostatic comb drive that avoids overshoot and ringing is desirable. It is further desirable that the comb drive be reliably actuated with a relatively simple actuation signal, have high manufacturing yields, and be robust.

BRIEF SUMMARY OF THE INVENTION

The invention provides a bi-directional self-braking electrostatic comb drive. The motive force of the comb drive is used in combination with a mechanical spring to achieve bidirectional operation with a single set of movable fingers and two sets of fixed fingers. The fingers do not have a constant width, as viewed from the top, but rather have thick portions attached to the base or movable portions of the device with thinner portions. When the interdigitated thick portions are aligned, the device is at the electrostatic center as this is the configuration at which the electrostatic attraction is the least.

Attractive electrostatic force draws the halves of the comb drive together from an initial position. The momentum of the movable portion of the drive in combination with latching spring arms carries the movable portion through and past the electrostatic center. The latching spring arms latch the movable portion of the drive in the switched position, allowing electric power to be removed from the device while retaining the switch state. A second pulse again draws the movable portion back toward the electrostatic center, and momentum carries the movable portion to the initial position, where it is latched again.

In a particular embodiment, a latching spring arm provides additional motive force to carry the movable portion through the electrostatic center and to latch the device in one position or the other. In yet another embodiment, a device starting at the electrostatic center with zero momentum (achieved by applying sufficient voltage long enough to hold the center position) defaults to a known position by operation of the latching spring arms. Thus, this device may be initialized to a known state without sensing the routing of the switched signal.

In another embodiment the movable portion of the comb drive has opposing sets of fingers, each set interdigitated with a corresponding set of fixed fingers. The reciprocal nature of the device, namely that a simple, square-wave pulse of the same polarity will toggle the drive, in combination with the latching spring arms provides a compact and efficient MEMS actuator with relatively high motive force.

DETAILED DESCRIPTION OF THE INVENTION

1. Introduction

The present invention provides a compact, efficient, and predictable electrostatic comb drive that is easily reset to a default position and can be latched in either of two switch positions. The latching is achieved using mechanical means and hence the state of the switch can be maintained without the continuous application of electrical power or voltage. Efficiency is achieved with bidirectional pulling from either state with shaped comb fingers. The drive may be reset to a known state by applying an electric voltage between the movable and fixed fingers of the comb drive to hold the drive in the position of minimum electric potential, and then removing the voltage to release the comb drive to a default position.

2. Exemplary MEMS Devices

Figure 1A:
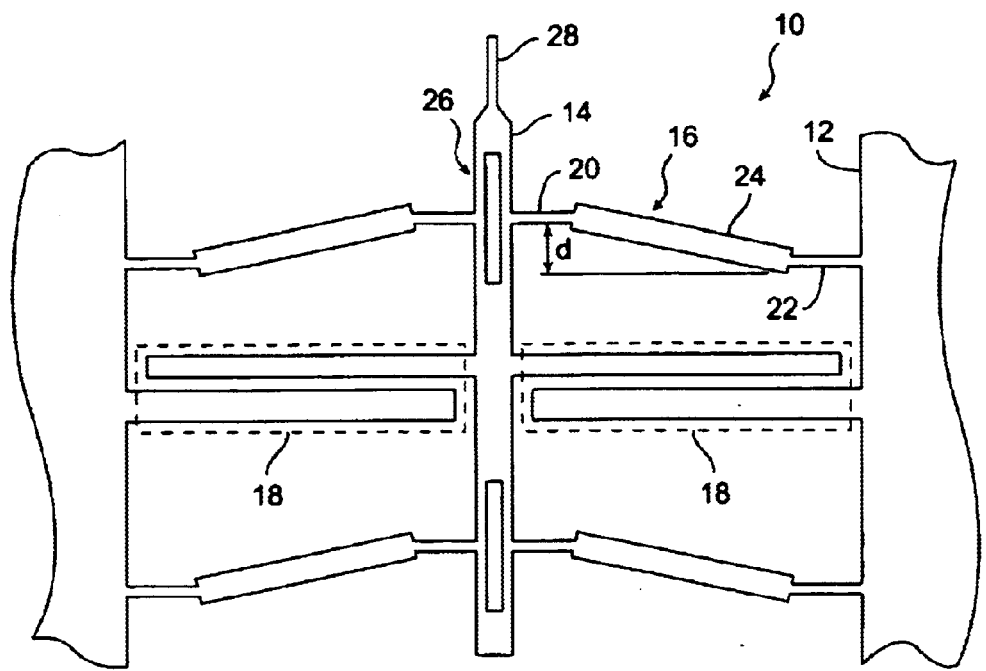
FIG. 1A is a simplified top view of an exemplary mechanical latching spring system that can be used with embodiments of the present invention.

FIG. 1A is a simplified top view of a MEMS device 10 with an exemplary mechanical latching spring system. The MEMS device has a base 12 or body and a movable element 14 attached to the base with latching spring arms 16. A comb drive actuator 18 according to an embodiment of the present invention includes a set of fixed fingers fixed to the body and a set of movable fingers fixed to the movable element 14 and interdigitated with the fixed fingers. The fingers are not shown in this figure for simplicity of illustration. The terms "fixed" and "movable" relate to the operation of the fingers in relation to the base of the MEMS device. A single comb drive or actuator is shown, but a MEMS device may have two or more comb drives.

The latching spring arms 16 include flexible hinges 20, 22 and a fairly rigid beam portion 24. The flexible hinges are offset by a distance, d, in the as-fabricated condition. The movable element includes a box section 26 with relatively thin walls that deform slightly and then spring back when the movable element 14 switches states. The movable element includes a mirror 28 or other switching element on one end of the center beam. When operated as an optical switch, the mirror is moved into and out of an optical beam(s). The light signals are generally carried to the switching element on waveguides, such as optical fibers. Such an optical switching device is described in co-pending, co-assigned U.S. patent application Ser. No. 09/517,649 entitled BI-STABLE MICRO SWITCH by Hichwa et al., filed Mar. 3, 2000, the disclosure of which is hereby incorporated by reference for all purposes.

Electrostatic comb drives according to embodiments of the present invention generally include at least one set of movable fingers and one set of fixed fingers, the two sets being interdigitated. When a voltage is applied between the two sets of fingers, the movable fingers will be pulled toward the fixed fingers by electrostatic attraction to lower the potential energy of the system according to Equation 1:

$$F_{es}(x) = -0.5 d(C(x)V^2)/dx \quad \text{(Eq. 1)}$$

where $C(x)$ is the total capacitance between the static and moving fingers at the displacement of x and V is the applied voltage. If we neglect the damping of air, the total energy gained from the electrostatic field is shown in Equation 2:

$$E_{total} = \tfrac{1}{2} \Delta C(x) V^2 \quad \text{(Eq. 2)}$$

The total (electrostatic plus mechanical) energy is only dependent on the position of x, if the voltage is held constant.

Figure 1B:
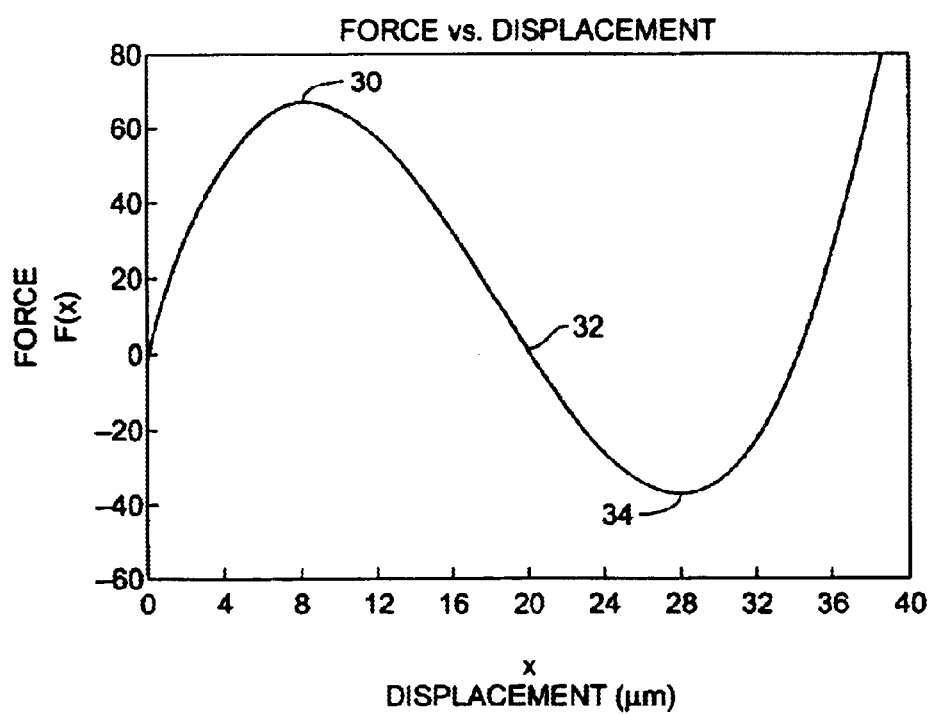
FIG. 1B is a simplified graph of force versus displacement for the latching spring system illustrated in FIG. 1A.
Figure 1C:
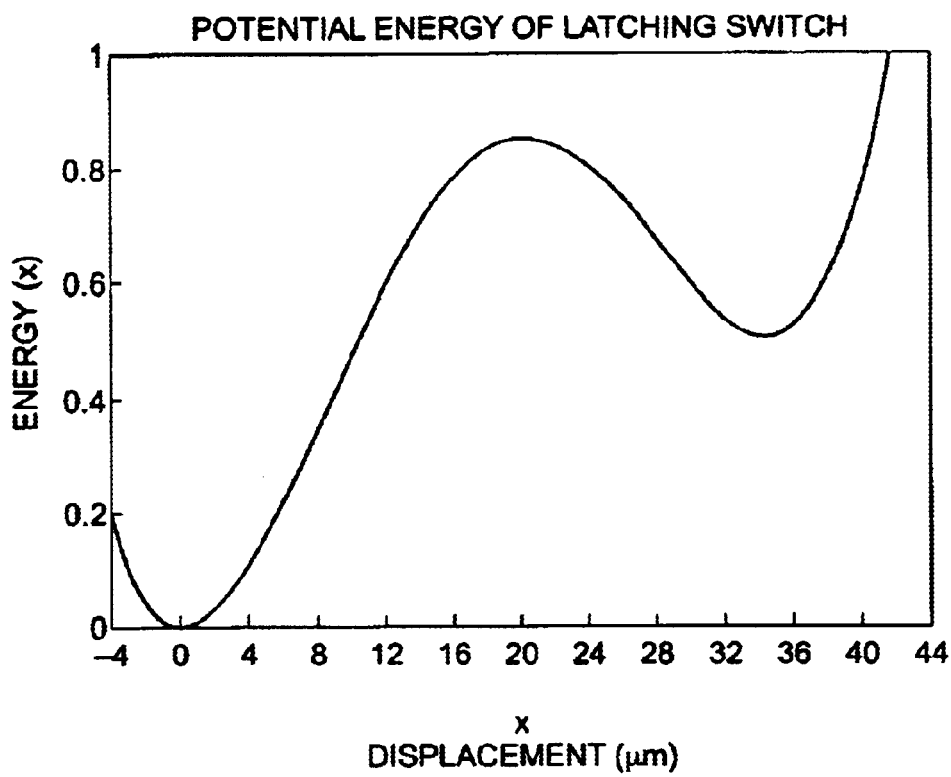
FIG. 1C is a simplified graph of energy versus displacement for the latching spring system illustrated in FIG. 1A.

FIG. 1B is a simplified graph of the predicted (modeled) force versus displacement for a movable portion of a latching MEMS switch with latching spring arms as it moves from the as-fabricated position, "0", over a force maximum 30 to a zero-force point 32 and then negative force to a force minimum point 34. FIG. 1C is a simplified graph of potential energy versus displacement of the latching MEMS switch of FIG. 1B. Note that the displacement in FIG. 1C is offset slightly to show the potential energy well at 0 displacement.

Figure 2A:
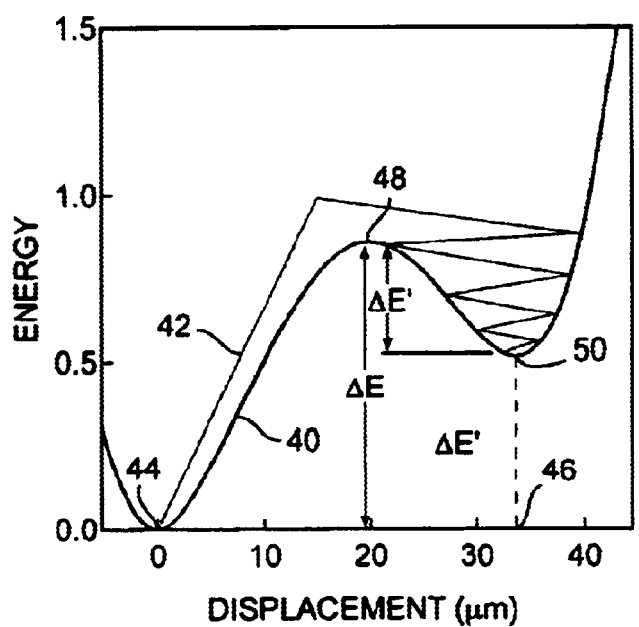
FIG. 2A is a simplified energy diagram during switching of a mechanical latching spring system illustrating ringing.

FIG. 2A is a simplified diagram of predicted energy versus displacement of a latching spring system and conventional electrostatic comb drive with straight fingers that illustrates ringing after a single actuating pulse is applied. The potential energy of the system (arising from the spring forces) 40 is shown with the total energy 42, which is a combination of the potential energy, the kinetic energy of the movable portion of the device, and the electrostatic energy. The potential energy is at a minimum, or zero, 44 typically in the as-fabricated condition. Movement of the movable portion of the device in either direction will increase the potential energy of the system.

With straight fingers (i.e. constant or nearly constant width), the electrostatic force is almost constant in the range of travel when the voltage is on, and the total energy is almost a linear function with displacement. To switch from the initial position, "0", to the switched position 46 (which occurs at a local potential energy minimum), the moving part must gain enough energy to overcome the potential energy barrier ΔE. However, if the voltage is simply turned off when the movable part gains enough energy at the local potential energy maximum 48, the conversion of potential energy to kinetic energy from the spring arms and other spring energy in the system as the device moves from the local maximum 48 to the local minimum 50 will result in a high velocity that causes the mirror to overshoot its intended position and oscillate about it until the residual energy is dissipated by air damping or other dissipative mechanisms. In some instances, the actuator might overshoot with sufficient energy to overcome the potential energy barrier ΔE' and latch back into its original position.

Such ringing can reduce the useful area of the mirror if the mirror is reflecting an optical beam while the device is ringing. Alternatively, the ringing will increase cycling (switching) time if one must wait for the device to settle before switching the optical beam. In some instances a compromise might be struck where both the useful area of the mirror and the switching time are diminished. Thus, ringing is not desirable in switch operation and should be reduced if possible. Passive damping is small in air or other gases, and immersing the device in a fluid, such as oil, is generally undesirable or even unacceptable in commercial applications.

A braking pulse can be used to slow the motion of the movable member after it has passed the local energy maximum, but must be appropriately timed to provide braking without compromising switch operation. The braking pulse is usually a second pulse applied to the opposing set of comb fingers on a conventional electrostatic comb drive. Variations between individual MEMS devices may require that the actuating and braking pulses be determined on a chip-by-chip basis, which is undesirable for volume manufacturing.

Figure 2B:
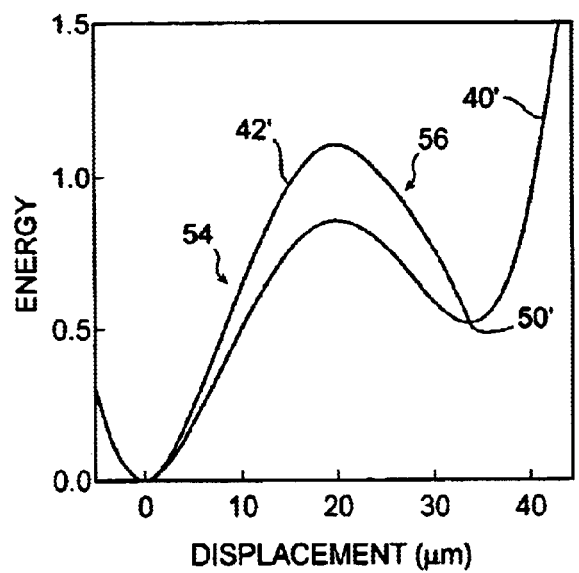
FIG. 2B is a simplified diagram illustrating predicted energy versus displacement with reduced ringing in a MEMS switching device with an electrostatic comb drive according to an embodiment of the present invention.

FIG. 2B is a simplified diagram illustrating predicted energy versus displacement with reduced ringing in a MEMS switching device with an electrostatic comb drive according to an embodiment of the present invention. In order to reduce the ringing, the kinetic energy is quickly removed from the system by electrostatic attraction. The electrostatic comb drive structure is designed so that the total energy curve 42' closely matches the potential energy curve 40' of the latching spring. The total energy curve consists of a "rising" portion (acceleration) 54 and a "falling" portion (deceleration) 56. If the total energy equals the potential energy at the target mechanical equilibrium position 50' when the driving voltage is turned off the mirror will stay in the target position without ringing.

The comb fingers are shaped to achieve acceleration and deceleration during a single "drive" pulse. Therefore, a single set of fingers can provide both a push and a pull action, the designations of which are arbitrary. When the electronic pulse starts, the finger sets are drawn towards each other. The fingers have a wide portion and a narrow portion. The electrostatic energy is at a minimum when the wide portions of the movable fingers are aligned with the wide portions of the fixed fingers and applying an electric potential between the fingers causes the movable element to accelerate toward this position. However, the momentum and spring forces carry the movable element past the point where the wide portions of the fingers are aligned. If the electric potential between the fingers is still present, it will decelerate the movable portion because the electrostatic forces will be opposite to the direction of motion, i.e. in the direction to pull the wide portions of the fingers back together. Thus, a single complementary set of fingers can provide both a "pull" and "push" function during a single drive pulse.

3. An Exemplary Comb Drive

Figure 3A:
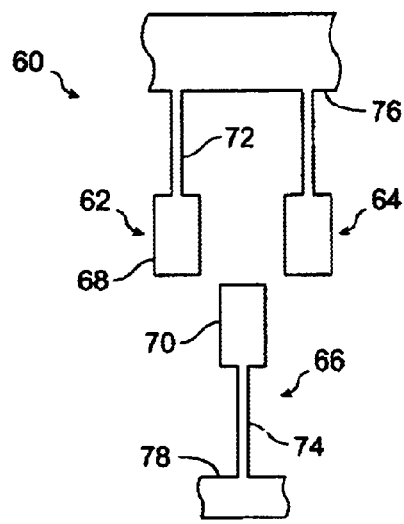
FIG. 3A is a simplified top view of a portion of an electrostatic comb drive according to an embodiment of the present invention in a first switch position.

FIG. 3A is a simplified top view of a portion of an electrostatic comb drive 60 according to an embodiment of the present invention in a first switch position or state. The comb drive includes fixed fingers 62, 64 and movable fingers 66, only one of which is shown for simplicity of illustration. Comb drives typically have dozens, if not hundreds, of interdigitated fingers, and are often formed in thin films of silicon using photolithography and anisotropic etching techniques. In this embodiment, each finger has a wide section 68, 70 and a narrow section 72, 74 attaching the wide section to the base 76 or movable element 78, respectively.

The wide sections increase the inter-finger capacitance when they are aligned to overlap, thus decreasing the electrostatic potential. In a particular embodiment the narrow sections were about 3 microns wide and the wide sections were at least 7 microns wide. The gap between the fingers when the wide sections are overlapped is about 1–2 microns. In another embodiment, the narrow sections were about 3 microns wide and the wide sections were about 13 microns wide. It is generally desirable that the wide sections be at least three times wider than the narrow section to facilitate bidirectional operation of the electrostatic comb drive. When a voltage is applied between the fixed and moving electrodes, the moving part experiences an attractive force to pull it toward the fixed part so that the thick portions are aligned and the gap between the fingers is the least.

Although the wider sections are illustrated as rectangular blocks, other shapes may be fabricated to achieve desired electrostatic drive performance. For example, the wider sections could be wider near the tip to facilitate more rapid initial acceleration of the movable portion, tapering to a narrower width near the narrow section to reduce the total electrostatic force-time product. Similarly, it is not necessary that the wider sections on the fixed fingers be the same or even similar to the wider sections on the movable fingers.

Figure 3B:
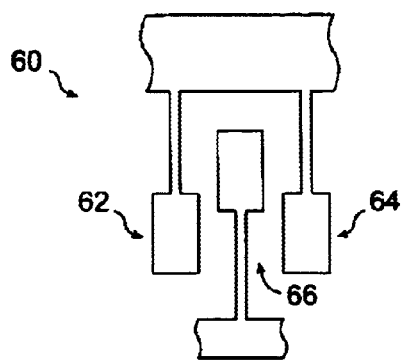
FIG. 3B is a simplified top view of the portion of the electrostatic comb in drive of FIG. 3A in a second switch position.

FIG. 3B is a simplified top view of the comb drive shown in FIG. 3A in a second position. The movable fingers 66 have been attracted to the fixed fingers 62, 64 by applying a voltage pulse between the two halves of the comb drive. The voltage pulse was maintained long enough to accelerate the movable portion of the drive to a sufficient energy to reach the second position. The voltage pulse can be maintained after the wide portions of the two sets of fingers pass each other to slow the movable portion before it reaches the second position. Spring arms or other motive elements can contribute to the movement of the movable portion. A latching technique holds the movable portion in the second position. Another feature is that once the movable element reaches the target position, voltage of the same polarity can be used to switch the movable element back to the initial position, also with deceleration. Thus the same or very similar electric pulse can be used to toggle the switch between states.

Figure 3C:
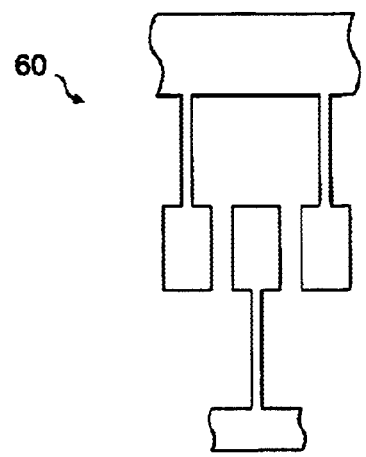
FIG. 3C is a simplified top view of the portion of the electrostatic comb drive of FIGS. 3A and 3B in an intermediate position for initialization or resetting of the switch.

FIG. 3C shows the comb drive of FIG. 3A when the voltage has been maintained for a sufficient period to hold the fixed and movable fingers in the lowest electrostatic potential state (assuming no momentum). Spring forces might offset the movable fingers in an actual device, i.e. the wide sections might not be exactly aligned, but the movable element would find the lowest energy position. In this configuration the electrostatic force acting on the movable fingers is balanced with the spring force. In some devices, the spring force might be small enough relative to the electrostatic force to ignore for purposes of modeling.

Figure 3D:
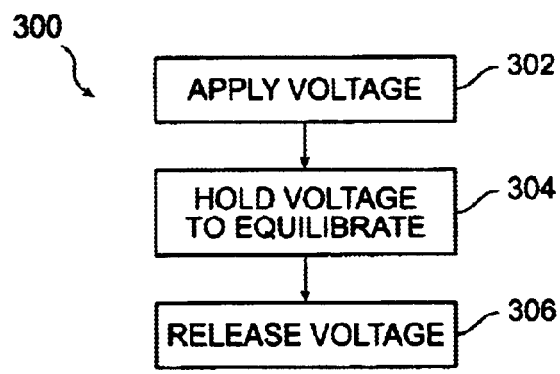
FIG. 3D is a simplified flow chart of a process for initializing an electrostatic MEMS drive according to an embodiment of the present invention.

FIG. 3D is a simplified flow chart of a process 300 for resetting or presetting (initializing) a MEMS device according to an embodiment of the present invention. In an electrostatic comb drive in which the force on a movable portion of the MEMS device is zero when a portion of a movable finger overlaps a portion of a fixed finger between a potential energy maximum and a potential energy minimum, a voltage between the movable finger and the fixed finger is applied (step 302) and held (step 304) for a period sufficiently long for the device to achieve a total energy less than the potential energy maximum and removing the voltage (step 306) so that the movable portion of the device assumes a selected position at the potential energy minimum. In a particular embodiment, the selected position is essentially the as-fabricated position.

Although the fixed and movable fingers are illustrated as having essentially the same shape, this is not required. Similarly, it is not required that each finger in a set (i.e. movable or fixed) have the same or even similar shape. In alternative embodiments, electrostatic, magnetic, or other mechanical latching means may be used. The latching spring arm avoids the need to time latching or release signals, as are sometimes used with electrostatic and magnetic latching techniques.

For purposes of modeling, a standard latching spring arm and deformable center beam was defined. Each hinge has a width of about 1.8 microns with a length of about 150 microns, and a total length of the spring arm of about 800 microns. The deformable portion of the beam has a width of 6.8 microns and a length of 200 microns. The offset between hinges is 18 microns.

Figure 3E:
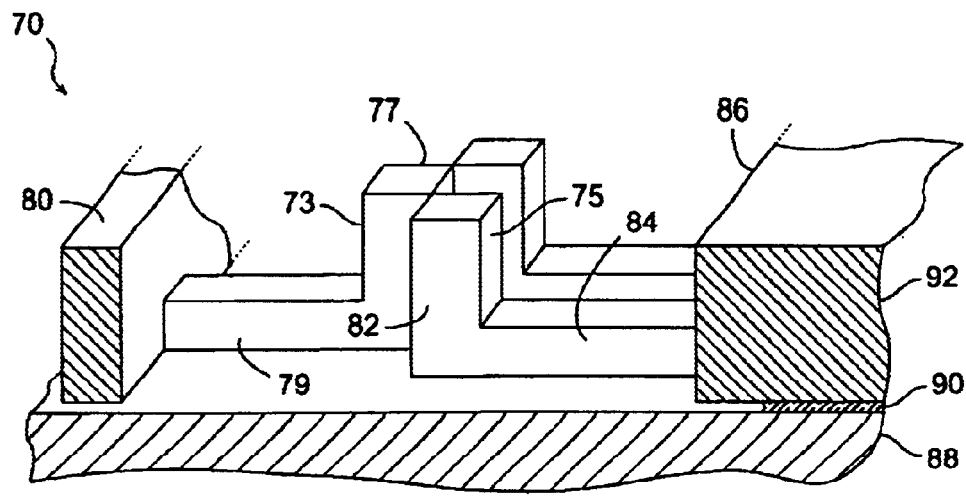
FIG. 3E is a simplified perspective view of a portion of an electrostatic comb drive according to an embodiment of the present invention.

FIG. 3E is a simplified cut-away perspective view of a portion of an electrostatic comb drive 70 according to another embodiment of the present invention. In this embodiment, relatively narrow (e.g. 2–3 microns) fingers 72, 74 have been processed to have a tall section 76 near the end of the finger and a short section 78 attaching the tall section to the center beam 80. A fixed finger 74 similarly has a tall section 82 and a short section 84 attaching the finger to the base 86. In some embodiments the fixed fingers do not have to be freed from the underlying substrate 88 but may remain attached to the underlying substrate though the bonding layer 90.

The fingers are formed in the superstrate 92, which is typically a thin film of silicon about 40–80 microns thick. RIE techniques are used to form the fingers, typically in a two-step etch process. It is generally desirable that the tall section of the fingers is at least about three times as high as the short section of the finger to facilitate bi-directional electrostatic action.

Figure 3F:
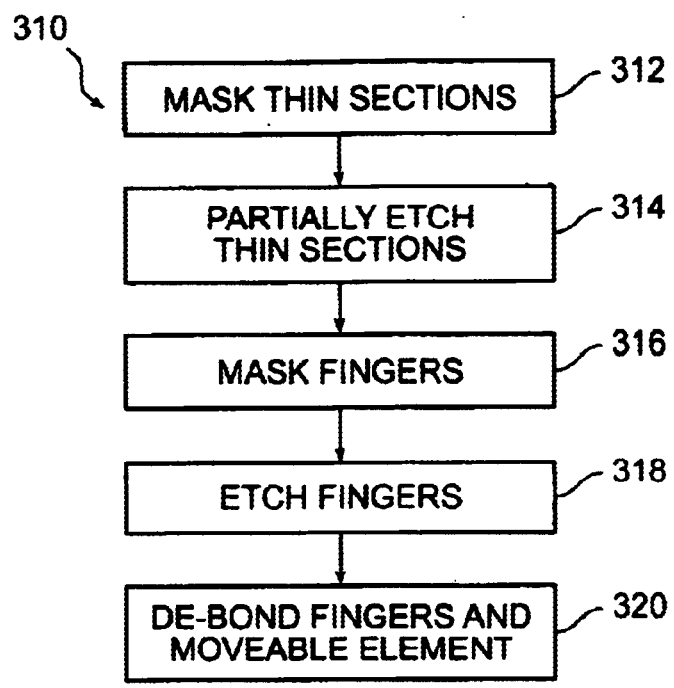
FIG. 3F is a simplified flow chart of a process for fabricating an electrostatic comb drive according to another embodiment of the present invention.

FIG. 3F is a simplified flow chart of a process 310 for fabricating an electrostatic comb drive according to an embodiment of the present invention. The substrate is masked using photolithographic techniques to expose a first portion, which will become the thin section of a fixed finger, and to expose a second portion, which will become the thin section of a movable finger (step 312). The superstrate is partially removed from the exposed portions (step 314), leaving a desired thickness of the superstrate. The substrate is masked using photolithographic techniques to cover the first portion and associated fixed finger area and to cover the second portion and associated movable finger area (step 316), and the device is etched to form the movable finger and the fixed finger (step 318) in the superstrate. The photolithographic and etch steps may be reversed in order, i.e. the thinning could be done after the finger is patterned, if desired. The bonding layer is then removed from beneath at least the movable finger (step 320) to free the movable portion of the electrostatic comb drive from the substrate; however, the bonding layer does not necessarily have to be removed from beneath the fixed fingers.

4. Comb Drive Energy Modeling

Figure 4A:
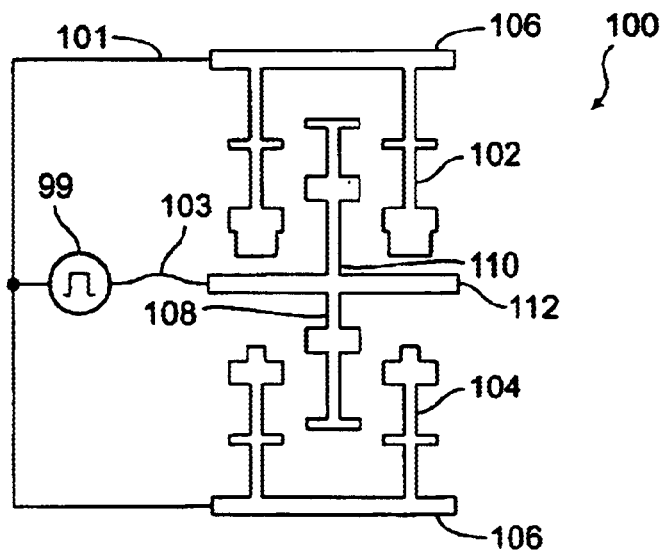
FIG. 4A is a simplified top view of a portion of an electrostatic comb drive according to another embodiment of the present invention.

FIG. 4A is a simplified top view of a portion of an electrostatic comb drive 100 according to an embodiment of the present invention used to model the energy of the drive. The comb drive has two sets of fixed fingers 102, 104 attached to the base 106 and two sets of opposed movable fingers 108, 110 attached to a center beam 112 of the movable element. A voltage supply 99 is connected between the fixed and movable sets of fingers with two wires 101, 103. One wire 103 is flexible to accommodate the motion of the movable element. When an actuating voltage is applied between the movable fingers and the fixed fingers, the first set of fixed fingers 102 attracts the first set of movable fingers 108, and the second set of fixed fingers 104 attracts the second set of movable fingers 110. The voltage supply can toggle the device in either direction by applying a simple square-wave pulse, i.e., a pulse that provides an essentially constant voltage between its start and stop points.

Figure 4B:
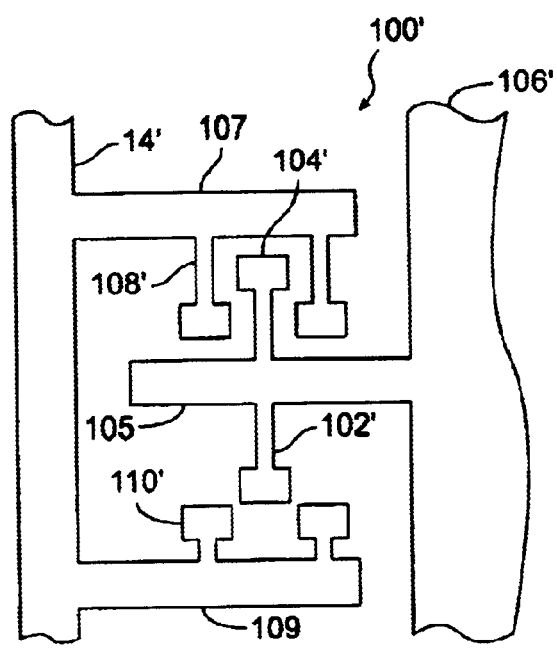
FIG. 4B is a simplified top view of a portion of an electrostatic comb drive according to yet another embodiment of the present invention.

FIG. 4B is a simplified top view of a portion of an electrostatic comb drive 100' according to another embodiment of the present invention. In this embodiment, the fixed fingers 102', 104' are opposed to each other and are attached to a single fixed transverse beam 105 attached to the base 106'. The movable fingers 108', 110' are attached to two movable transverse beams 107, 109 that are attached to a movable center beam 14'.

Figure 4C:
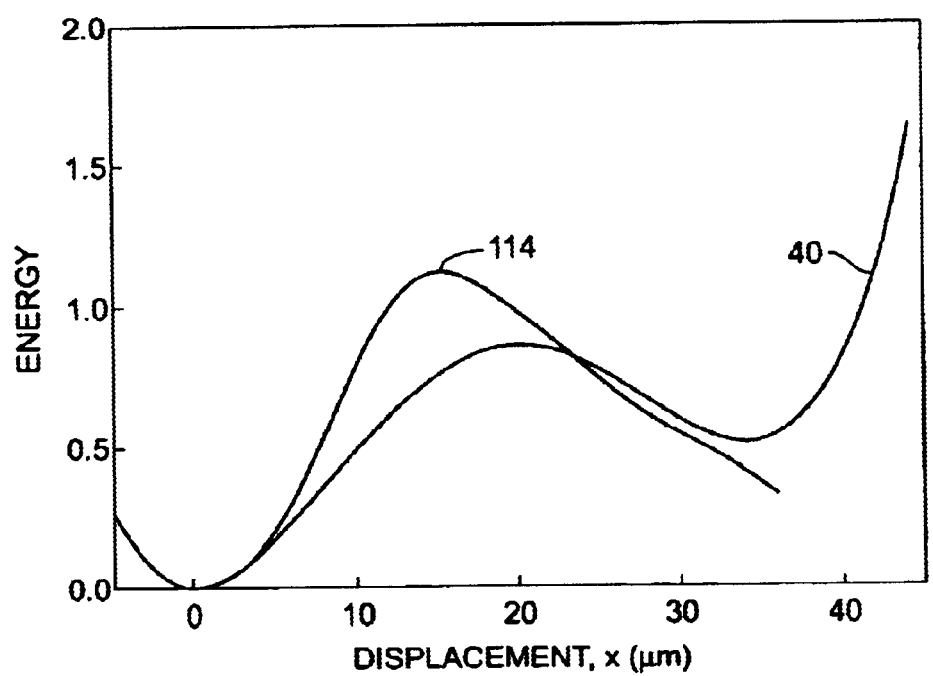
FIG. 4C is a simplified energy diagram for the electrostatic comb drive illustrated in FIG. 4A.

FIG. 4C shows the modeled energy 114 of the spring system and comb drive for the finger design illustrated in FIG. 4A and the potential energy 40 versus displacement. The energy scale is arbitrary units and is provided for purposes of illustration. A desirable switching energy for MEMs devices might typically be in the range of mJ to nJ, although more or less energy might be desirable in certain situations. For example, a device with a heavier movable element might require more energy than a device with a lighter movable element. Similarly, a device that is designed to withstand high impact or acceleration forces might require more energy to operate than a device with a low G-force rating.

It was assumed that the comb drive had 150 fingers on each set and an actuating voltage of 35 V was chosen for modeling purposes. It was assumed that the hinges would not buckle during operation. The maximum stress should be well below 2 GPa to insure the assumed silicon material would not rupture. The maximum constraint spring force at maximum allowable displacement (maximum 20 microns further than the equilibrium position) should be larger than $500*g*m$, where g is the gravitational acceleration constant and m is the total mass of the moving parts f the comb drive (estimated to be about 50 micro-grams), to survive a G-force ("drop") test. Further limitations might be imposed by other design criteria, such as allowable die size for the MEMS device. It is generally desirable that the width of the smallest feature should be as big as practical to cope with variations in the fabrication process. The energy barrier should be as low as possible while being high enough to prevent incidental toggling.

The design of the finger shape for a comb drive is based on the latching spring system shown above in FIG. 1A. The design strategy optimizes the finger shape to achieve a total energy curve (Ref. Eq. 2) that closely matches the potential energy curve of the system. The use of two sets of opposed movable fingers 108, 110 as shown in FIG. 4A enables a design strategy wherein the fingers 108, 110 may have different shapes to optimize the match between the total energy and the potential energy curves. It is desirable that the fingers are designed so that the two energy curves intersect at the two potential energy minima, and that the total energy curve closely matches the potential energy curve. It is further desirable that the slopes of the total energy curve and the potential energy curve be close near the intersections of the curves. This relationship between the total and potential energy curves provides a lower speed of the mirror as it approaches the target (stopped) position. This allows a greater tolerance in the duration of the driving/ decelerating pulse. High excess kinetic energy between the two potential energy minima is desirable to achieve fast switching.

5. Optimizing Finger Shape

Figure 5A:
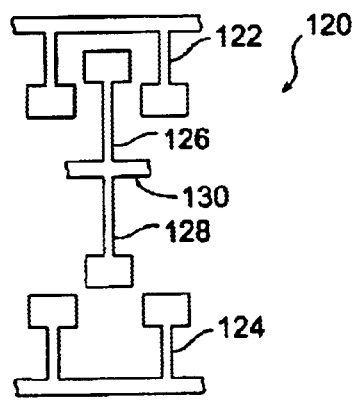
FIG. 5A is a simplified top view of a portion of an electrostatic comb drive showing dual complimentary finger sets according to another embodiment of the present invention in a first switch position.
Figure 5B:
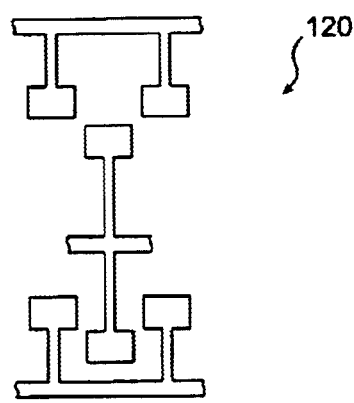
FIG. 5B is a simplified top view of the portion of the electrostatic comb drive of FIG. 5A in a second switch position.

FIGS. 5A–5D are simplified top views of two types of comb fingers designed according to the present invention. FIG. 5A shows a simplified top view of a portion of a comb drive 120 according to an embodiment of the present invention having "push-pull" configuration having two sets of fixed fingers 122, 124 and two sets of movable fingers 126, 128 extending in opposite directions from a center beam 130 toward each of the sets of fixed fingers in a first, e.g. as-fabricated, position. FIG. 5B shows the comb drive of FIG. 5A in the other stable (switched) position.

Figure 5C:
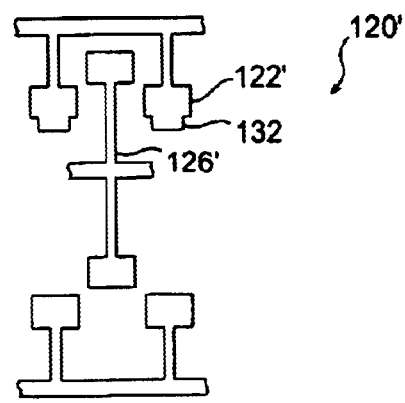
FIG. 5C is a simplified top view of a portion of another electrostatic comb drive according to an embodiment of the present invention in a first switch position.

FIG. 5C is a simplified top view of a portion of an electrostatic comb drive 120' similar to that shown in FIG. 5A with the addition of smaller extension elements 132 on the end of the fingers in a first stable position. The extension elements increase the initial electrostatic force between fingers. The extension elements are illustrated on the first set of fixed fingers 122', but could be on the movable fingers 126' or on several sets of fingers.

Figure 5D:
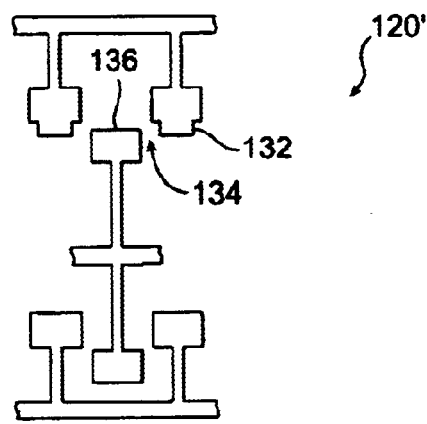
FIG. 5D is a simplified top view of the portion of the electrostatic comb drive shown in FIG. 5C in a second switch position.

FIG. 5D shows the portion of the electrostatic comb drive 120' illustrated in FIG. 5C in another stable (switched) position. Note the overlap 134 between the extension element 132 and the end of the movable finger 136. Some degree of undercutting typically occurs during fabrication, and closely overlapping the sets of fingers may be undesirable. The extension features, which are generally more narrow than the wide portions 138 of the fingers, allows initial overlap in the as-fabricated state on one or both complimentary pair sets of fingers. The initial attractive force when an actuating signal is applied is obtained through fringe capacitance between the extension element 132 and the wide portion of the complimentary finger(s). These extension elements increase the electrostatic force an average of about 60%.

Referring to FIGS. 3A–3C and 5A–5D, when moving the fingers from one position to another the total capacitance (C(x)) changes with the distance of travel (x). For purposes of illustration, we will define x=0 at the first position and x=2(d) where d is the offset of the latching spring system at the other stable (latching) position. At x=d, the wider portions of both sets of fingers are aligned. If a constant voltage is applied between the fingers, the total energy gained by the movable portion of the comb drive is proportional to the change in capacitance C(d)–C(0). Therefore, in order to have a decelerating force at d<x<2d, C(x) must decrease with x in that range such that the total energy, $E_{TOT}$, should intersect the potential energy curve minimum of the latching spring.

Figure 5E:
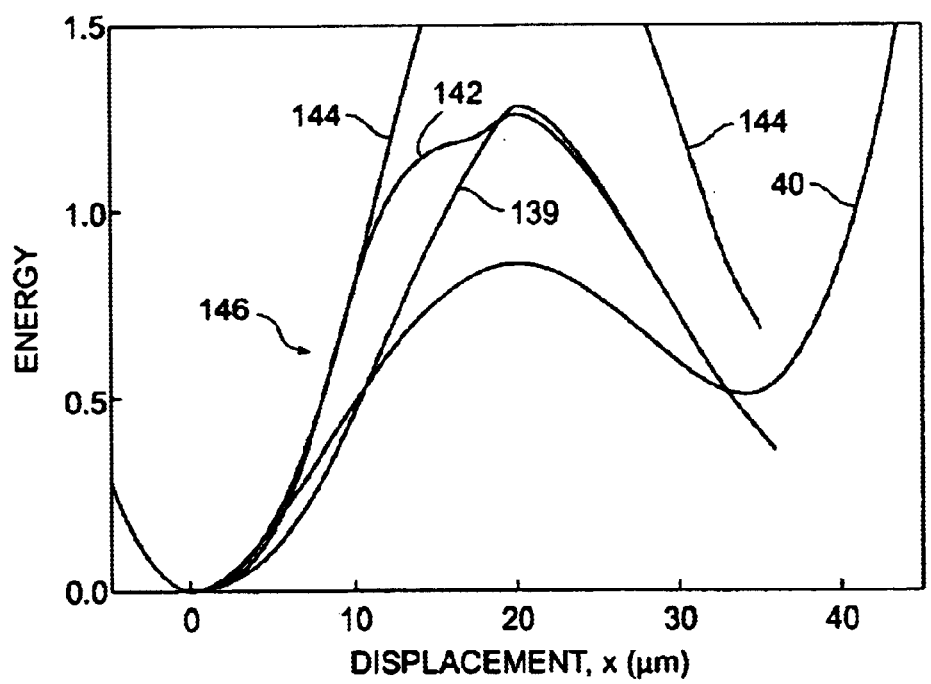
FIG. 5E is a simplified energy diagram illustrating the predicted switching behavior of comb drives having comb fingers according to FIG. 5A and according to FIG. 5C.

FIG. 5E is a simplified graph illustrating the predicted total energy versus displacement for an electrostatic comb drive fabricated with fingers according embodiments of the present invention under various conditions. Comparing curve 142 with curve 139 illustrates the difference in energy arising from slight differences in the finger shape, such as between fingers according to FIGS. 5C and 5A, each being driven with 35 V. Other parameters of the model are constant. A partial curve of the predicted total energy 144 versus displacement for a comb drive fabricated with fingers as-shown in FIG. 5A at a drive voltage of 45 V is also shown, thus illustrating the effect drive voltage can have on electrostatic comb drives. Without the smaller features on the fingers associated with curve 142, a 10 V higher drive voltage is required to achieve the same acceleration in the region of the rising energy potential 146, i.e. to achieve a similar switching time. This graph also illustrates that suitable devices might operate at less than 40 V.

Those skilled in the art will appreciate that the modeled curves are shown for purposes of comparison to illustrate how changes in the finger shape and drive voltage can affect response. In other words, many details of the modeled device contribute to the predicted response, such as movable mass, spring forces, finger shape, number of comb finger pairs, drive voltage, and thickness of the superstrate, to name a few, and that the same or a very similar response characteristic(s) might be obtained for several different physical designs.

6. Switching Time and Ringing

Figure 6A:
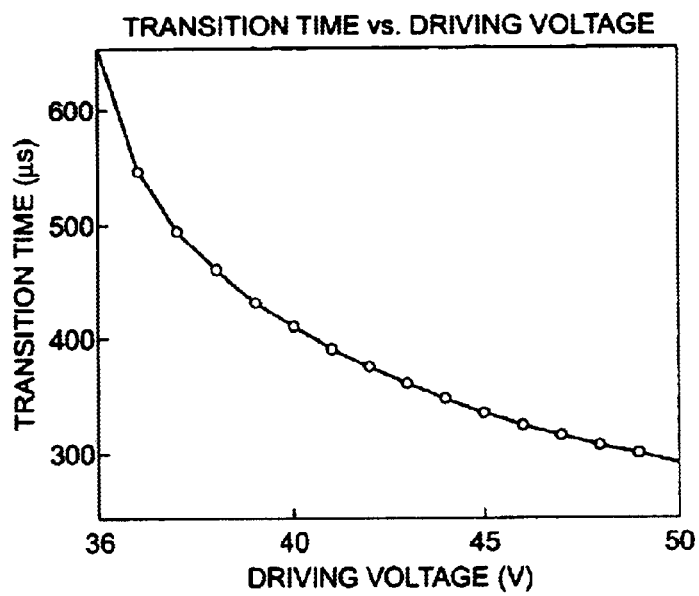
FIG. 6A is a simplified graph of the predicted transition time versus driving voltage for an electrostatic comb drive according to an embodiment of the present invention.

FIG. 6A is a simplified graph illustrating predicted transition time as a function of driving voltage for a comb drive with fingers according to an embodiment of the present invention. The same modeling parameters were used that generated curve 144 in FIG. 5E, but the choice of this model is somewhat arbitrary as any number of other models could be used to illustrate the same concept. While it is generally desirable to have as short a transition time as possible, it is desirable in some applications to keep the drive voltage below 40 V. Many applications use voltage doubling circuits to step up the voltage, for example, 5-10-20-40 V. Each doubling process consumes power and introduces conversion losses; hence generating higher voltages becomes less and less efficient. Other electronic components in the device might be susceptible to damage from voltages exceeding 40 V. Of course, damage might also occur at lower voltages, but generally speaking, the higher the maximum on-chip voltage, the greater the risk of damage. In order to obtain voltages over 40 V, the fabrication process might have to be modified. For example, the thickness of a dielectric layer might need to be increased to avoid dielectric breakdown in the device.

The mechanical transition time is defined for purposes of these graphs as the duration from the as-fabricated position to the target intersection position. The intersection position changes with voltage for a given design; therefore, the intersection point will be coincident with the position of the target minimum on the potential energy curve only at certain driving voltages. Several finger designs were modeled for transition time. The transition times were all between 300–700 microseconds within the driving voltage range of 35–50 V. The comb drive with fingers modeled in accordance with trace 144 of FIG. 5E has the shortest transition time because it has the highest excess (kinetic) energy.

Figure 6B:
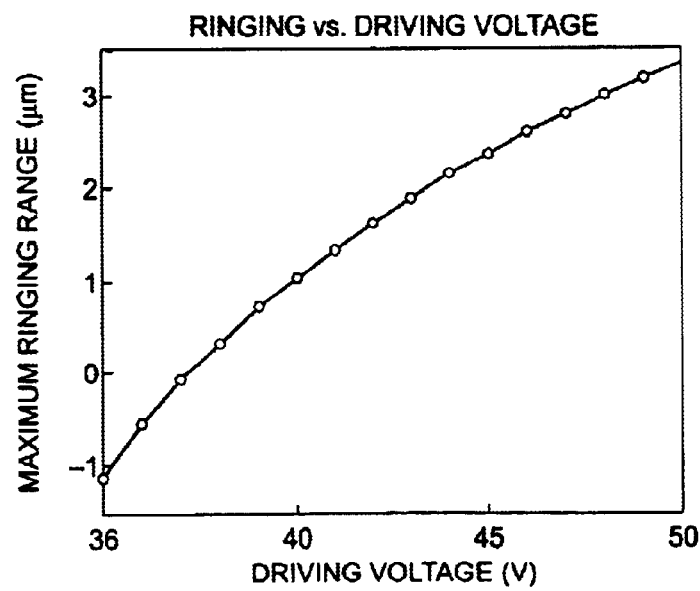
FIG. 6B is a simplified graph of the predicted ringing versus driving voltage for an electrostatic comb drive according to the embodiment modeled in FIG. 6A.

FIG. 6B is a simplified graph showing the predicted range of maximum ringing as a function of driving voltage for a comb drive according to an embodiment of the present invention. Generally, comb drives with the shorter transition times have the greater ringing ranges (excursions). For each design there is an optimum voltage under which the residual ringing will be zero, given a pulse of the proper duration. Fortunately, comb drives with fingers according to embodiments of the present invention provide automatic deceleration if the driving pulse is maintained after the movable element passes the potential energy maximum between the two switch states. At this optimum voltage, the duration of the driving pulse should match the transition time as nearly as possible to maximize the braking effect of the pulse.

7. Reduction of Mass in the Movable Element

Figure 7:
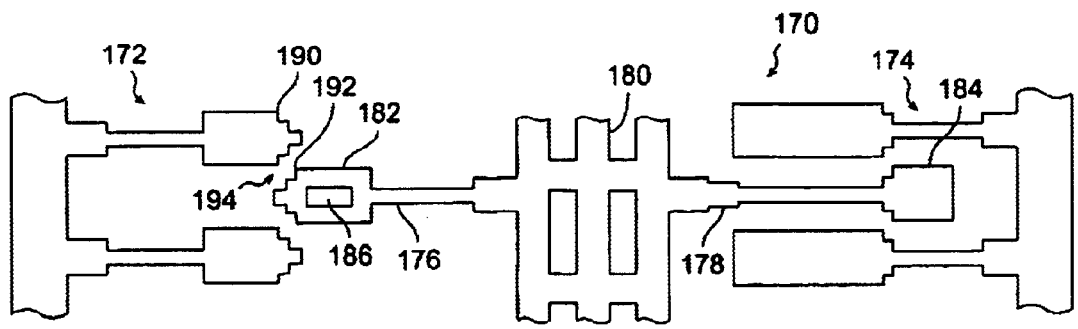
FIG. 7 is a simplified top view of a portion of an electrostatic comb drive according to an embodiment of the present invention.

FIG. 7 is a simplified top view of a portion of a comb drive 170 according to an embodiment of the present invention. Two sets of fixed fingers 172, 174 operate in conjunction with fingers 176, 178 on the movable portion 180 of the comb drive. The mass of the fingers on the movable portion of the comb drive has been reduced by removing a center portion of the wide portions 182, 184 of the movable fingers. In one instance, an enclosed center portion 186 has been removed. Reducing the mass of the movable element can improve the transition time and reduce the tendency for the device to ring, given a damping function. Removing portions of the wide portion of the fingers also facilitates release from the underlying oxide layer.

Some of the fingers have notches 190, 192 on the corners of the wide portions to improve fabrication of overlapping regions 194 of the fingers by facilitating the removal of material by anisotropic etching while retaining the inter-finger clearance (actuation gap or closest approach), which is usually on the order or 1–3 microns. Alternatively, the corners could be beveled. Overlap of the fingers is desirable to improve the initial electrostatic attraction of the fingers, and hence transition time, and in this embodiment some portion of at least one set of complimentary features is overlapping in both switch positions.

8. Accommodation for Variation in Device Fabrication

In a conventional MEMS fabrication process, devices in a relatively thin (e.g. 20–80 micron) layer of silicon are patterned using photolithography techniques. The thin film of silicon is bonded to the underlying substrate with a layer of silicon dioxide or other material. A deep reactive ion etching technique removes the thin film of silicon where it is not protected by the photolithographic mask to expose the underlying silicon dioxide. A wet chemical or other etch that is highly selective for silicon dioxide over silicon, such as a hydro-fluoric acid wash, removes the exposed silicon dioxide and undercuts the silicon dioxide. If the overlying silicon feature is relatively wide, it remains bonded to the underlying substrate. If the overlying silicon feature is relatively narrow, the HF wash undercuts from both sides to free the feature from the substrate.

Figure 8A:
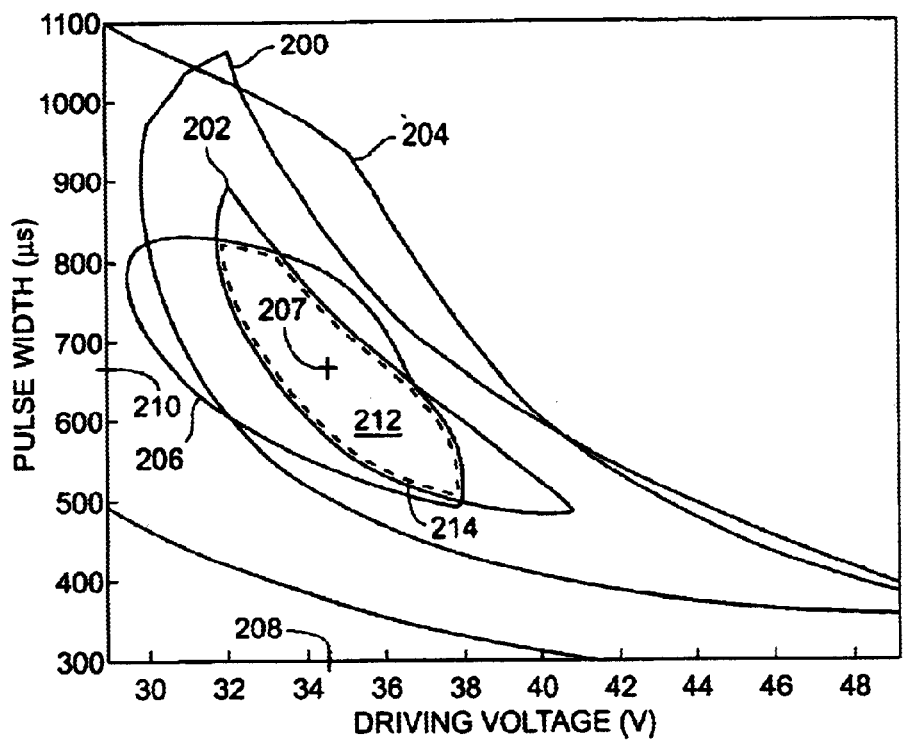
FIG. 8A is a simplified graph illustrating the actuation window for a MEMS device according to an embodiment of the present invention with zero as-fabricated offset.

FIG. 8A is a simplified graph of pulse width versus driving voltage illustrating the actuation window of a comb drive modeled according to an embodiment of the present invention with zero critical dimension ("CD") variation. The CD variation is usually a table of values defining the maximum and minimum dimensions for various critical elements of the device, such as hinge width, finger width, and the width of the gap between fingers. The four curves represent the maximum allowable forward travel 200 the maximum allowable forward ringing 202, which in this instance was chosen as 5 microns, the maximum allowable back travel 204, and the maximum allowable backward ringing 206, also defined as 5 microns. Zero ringing, represented by the "+" sign 207, would occur with an actuating pulse having the associated driving voltage 208 and pulse width 210. The desired actuating pulse should have a duration and voltage falling within the actuation window 212 that lies within all four curves, represented by the dashed line 214.

Figure 8B:
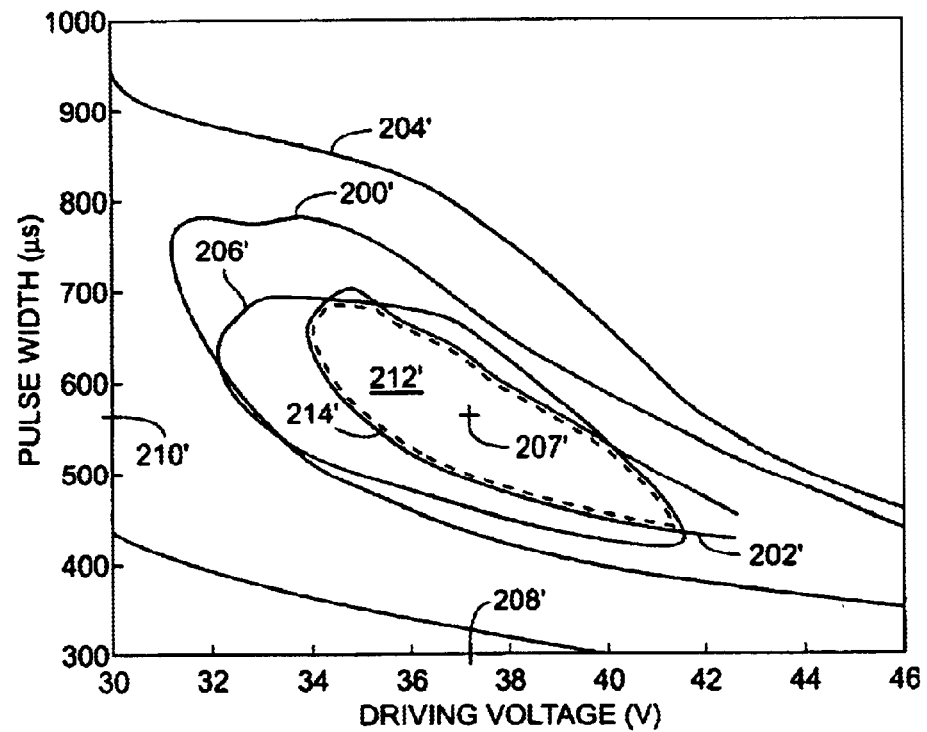
FIG. 8B is a simplified graph illustrating the actuation window of a MEMS device according to the embodiment modeled in FIG. 8A with a specified offset.

FIG. 8B is a simplified graph of pulse width versus driving voltage illustrating the actuation window of a comb drive modeled according to an embodiment of the present invention with a CD variation of 0.2 microns. Note that the scales are slightly different from FIG. 8A for purposes of illustration. The four curves represent the maximum allowable forward travel 200' the maximum allowable forward ringing 202', which in this instance was defined as 5 microns, the maximum allowable back travel 206' and the maximum allowable backward ringing 208' also defined as 5 microns. Zero ringing, represented by the "+" sign 207' would occur with an actuating pulse having the associated driving voltage 208' and pulse width 210'. Again, a desired actuation pulse for this device would have a pulse duration and voltage falling within the actuation window 212' of all four curves, represented by the dashed line 214'.

Figure 8C:
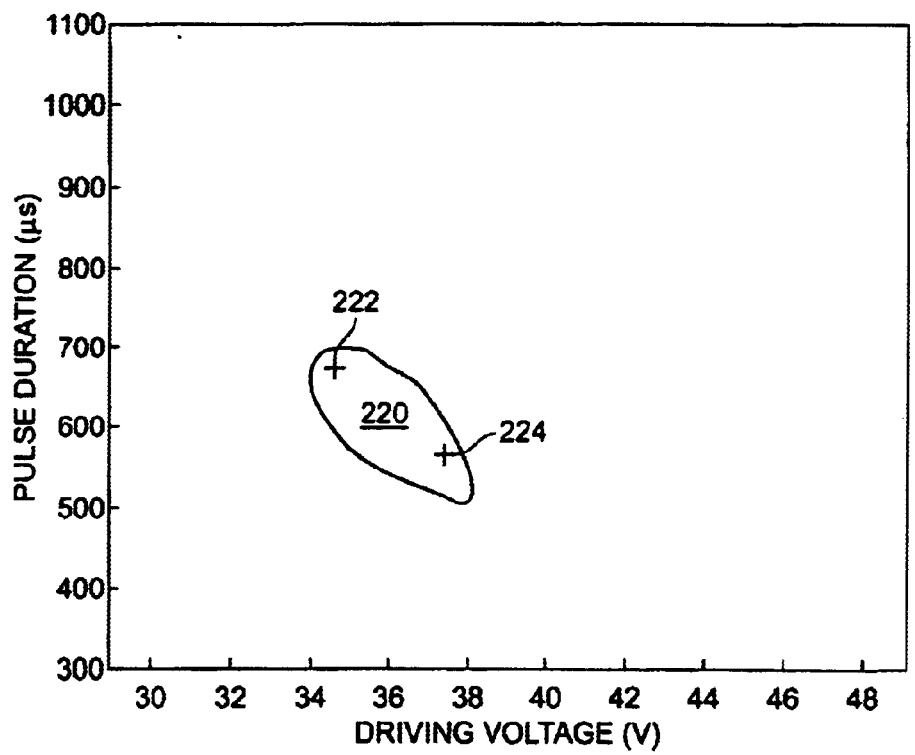
FIG. 8C is a simplified graph illustrating the resultant actuation window for MEMS devices having any offset between zero and the specified offset.

If FIGS. 8A and 8B were scaled and superimposed, the resulting congruent area of the actuation windows would be the actuation window appropriate for all devices having a CD variation up to 0.2 microns. FIG. 8C is a simplified graph of pulse duration versus driving voltage showing the resultant actuation window 220 obtained from the subset of the actuation windows of FIG. 5A and FIG. 8B, and the pulse that would produce no ringing for the zero CD variation 222 and 0.2 micron CD variation 224 devices. Thus, the actuation window not only accommodates for fabrication variation up to 0.2 microns, it also provides ranges of pulse duration and voltage. The pulse duration could be expressed as a function of voltage, for example, having tolerance limits about a line tending generally through the center of the resultant actuation window within driving voltage limits. Alternatively, a drive voltage could be selected (set) or measured, and the pulse duration set accordingly, or vice versa, or could be provided according to a look-up table defining the resultant actuation window.

Figure 8D:
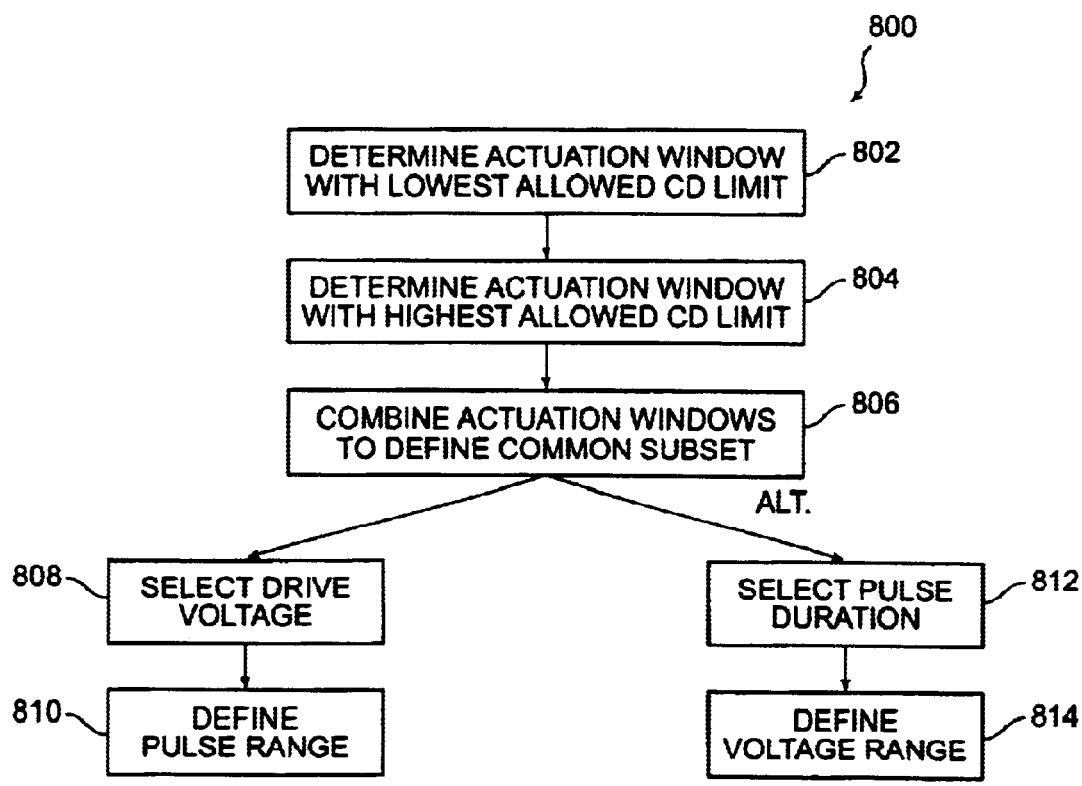
FIG. 8D is a simplified flow chart of a process for determining an actuation window according to an embodiment of the present invention.

FIG. 8D is a simplified flow chart for a process 800 of designing an electrostatic comb drive to accommodate variations in the fabrication offset and in the actuation pulse. The actuation window for an electrostatic comb drive of pulse duration versus drive voltage for the lowest allowed CD limit is determined (step 802), by measuring or modeling. The actuation window for the comb drive with a maximum allowable CD limit is determined (step 804). The order of these steps is arbitrary. Then, the two actuation windows are compared to find the common actuation widow (step 806). In a further embodiment, a drive voltage is selected (step 808) and the pulse duration tolerance is chosen (step 810) according to the common actuation window. In an alternative embodiment, a pulse duration is selected (step 812) and the driving voltage tolerance is chosen (step 814) according to the common actuation window. In either case, the actuation pulse is the product of the pulse voltage and pulse duration and falls within the common actuation window.

While the preferred embodiments of the present invention have been illustrated in detail, it should be apparent that modifications, adaptations, and equivalents to the described embodiments might occur to one skilled in the art. For example, the movable fingers could have thin and thick regions and the fixed fingers have narrow and wide regions, or vice versa. Similarly, although specific embodiments show a linear drive, rotary drives, such as using a hinge flexure may also be employed without departing from the scope of the present invention as set forth in the following claims.

What is claimed is:

1. An electrostatic comb drive comprising:

a base;

a movable element movably connected to the base and configured to move from a first stable position to a second stable position relative to the base;

a spring disposed between the base and the movable element and configured to provide a potential energy maximum between the first stable position and the second stable position;

a fixed finger attached to the base, the fixed finger having a first portion proximate to the base and disposed between the base and a second portion of the fixed finger; and a movable finger attached to the movable element, the movable finger having a third portion proximate to the movable element and disposed between the movable element and a fourth portion of the movable finger, a first capacitance arising between the fixed finger and the movable finger when the second portion is adjacent to the fourth portion and a second capacitance arising between the fixed finger and the movable finger when the second portion is adjacent to the third portion, the first capacitance being greater than the second capacitance.

2. The electrostatic comb drive of claim 1 wherein the second portion is wider than the first portion and the fourth portion is wider than the third portion.

3. The electrostatic comb drive of claim 1 wherein the second portion is at least three times as wide as the first portion.

4. The electrostatic comb drive of claim 1 wherein the first portion is less than four microns wide and the second portion is greater than six microns wide.

5. An electrostatic comb drive comprising:

a base;

a movable element movably connected to the base and configured to move from a first position to a second position relative to the base;

a spring disposed between the base and the movable element and configured to provide a potential energy maximum between the first position and the second position;

a fixed finger attached to the base, the fixed finger having a first portion proximate to the base and disposed between the base and a second portion of the fixed finger; and a movable finger attached to the movable element, the movable finger having a third portion proximate to the movable element and disposed between the movable element and a fourth portion of the movable finger, a first capacitance arising between the fixed finger and the movable finger when the second portion is adjacent to the fourth portion and a second capacitance arising between the fixed finger and the movable finger when the second portion is adjacent to the third portion, the first capacitance being greater than the second capacitance wherein the second portion is taller than the first portion and the fourth portion is taller than the third portion.

6. The electrostatic comb drive of claim 5 wherein the second portion is at least three times as tall as the first portion.

7. An electrostatic comb drive comprising:

a base;

a movable element movably connected to the base and configured to move from a first position to a second position relative to the base;

a spring disposed between the base and the movable element and configured to provide a potential energy maximum between the first position and the second position;

a fixed finger attached to the base, the fixed finger having a first portion proximate to the base and disposed between the base and a second portion of the fixed finger;

a movable finger attached to the movable element, the movable finger having a third portion proximate to the movable element and disposed between the movable element and a fourth portion of the movable finger, a first capacitance arising between the fixed finger and the movable finger when the second portion is adjacent to the fourth portion and a second capacitance arising between the fixed finger and the movable finger when the second portion is adjacent to the third portion, the first capacitance being greater than the second capacitance; and a mechanical latch to latch the movable element in one of the first position and the second position.

8. The electrostatic comb drive of claim 7 wherein the mechanical latch is combined with the spring to form a latching spring arm.

9. An electrostatic comb drive comprising:

a base;

a movable element movably connected to the base and configured to move from a first position to a second position relative to the base;

a spring disposed between the base and the movable element and configured to provide a potential energy maximum between the first position and the second position;

a first fixed finger attached to the base, the first fixed finger having a first portion proximate to the base and disposed between the base and a second portion of the first fixed finger; and a first movable finger attached to the movable element, the first movable finger having a third portion proximate to the movable element and disposed between the movable element and a fourth portion of the first movable finger, a first capacitance arising between the first fixed finger and the first movable finger when the second portion is adjacent to the fourth portion and a second capacitance arising between the first fixed finger and the first movable finger when the second portion is adjacent to the third portion, the first capacitance being greater than the second capacitance;

a second movable finger attached to the movable element and extending away from the movable element in a direction opposite to the first movable finger; and a second fixed finger proximate to the second movable finger and extending from the base toward the movable element, wherein the second movable finger is electrically coupled to the first movable finger and the second fixed finger is electrically coupled to the first fixed finger.

10. An electrostatic comb drive comprising:

a base;

a movable element movably connected to the base and configured to move from a first position to a second position relative to the base;

a spring disposed between the base and the movable element and configured to provide a potential energy maximum between the first position and the second position;

a fixed finger attached to the base, the fixed finger having a first portion proximate to the base and disposed between the base and a second portion of the fixed finger; and a movable finger attached to the movable element, the movable finder having a third portion proximate to the movable element and disposed between the movable element and a fourth portion of the movable finger, a first capacitance arising between the fixed finger and the movable finger when the second portion is adjacent to the fourth portion and a second capacitance arising between the fixed finger and the movable finger when the second portion is adjacent to the third portion, the first capacitance being greater than the second capacitance; and a voltage supply electrically coupled to the fixed finger with a first electrical connection and electrically coupled to the movable finger with a second electrical connection, the voltage supply configured to provide a first voltage pulse to toggle the movable element from the first position to the second position and to provide a second voltage pulse to toggle the movable element from the second position to the first position wherein the first voltage pulse and the second voltage pulse are essentially the same.

11. An electrostatic comb drive comprising:

a base;

a movable element movably connected to the base and configured to move from an initial position to a latched position relative to the base;

a fixed finger attached to the base, the fixed finger having a first narrow portion proximate to the base and a first wide portion distal from the base; and a movable finger attached to the movable element, the movable finger having a second narrow portion proximate to the movable portion and a second wide portion distal from the movable element, the second wide portion being drawn in a first direction toward the first wide portion from the initial position toward the latched position when a first voltage pulse is applied between the fixed finger and the movable finger, and being drawn in a second direction toward the first wide portion from the latched position when a second voltage pulse is applied between the fixed finger and the movable finger, the first direction being opposite to the second direction.

12. The electrostatic comb drive of claim 11 further comprising a latching spring arm.

13. The electrostatic comb drive of claim 11 further comprising an overlap portion extending away from the first wide portion toward the movable element, the overlap portion being at least partially adjacent to the second wide portion in one of the first position and the second position.

14. The electrostatic comb drive of claim 11 further comprising an overlap portion extending away from the second wide portion toward the base, the overlap portion being at least partially adjacent to the first wide portion in one of the first position and the second position.

15. The electrostatic comb drive of claim 11 wherein a center portion of the second wide portion bas been removed.

16. An electrostatic comb drive comprising:

a base;

a movable element;

a first latching spring arm movably connecting the movable element to the base;

a second latching spring arm movably connecting the movable element to the base, the first latching spring arm and the second latching spring providing a first potential energy minimum at a first stable position of the movable element relative to the base and providing a second potential energy minimum at a second stable position of the movable clement relative to the base, and providing a potential energy maximum between the first stable position and the second stable position;

a fixed finger attached to the base, the fixed finger having a first narrow portion proximate to the base and a first wide portion distal from the base, the first wide portion being at least twice as wide as the first narrow portion; and a movable finger attached to the movable element, the movable finger having a second narrow portion proximate to the movable portion and a second wide portion distal from the movable element, the second wide portion being at least twice as wide as the first narrow portion.

17. An electrostatic comb drive comprising:

a base;

a movable element configured to move from a first stable position to a second stable position relative to the base;

a fixed finger attached to the base, the fixed finger having a first short portion proximate to the base and a first tall portion distal from the base; and a movable finger attached to the movable clement and opposed to the fixed finger, the movable finger having a second short portion proximate to the movable element and a second tall portion distal from the movable element so that the movable element is pulled toward the base when an electric potential is applied between the fixed finger and the movable finger.

18. An electrostatic comb drive comprising:

a base;

a movable element configured to move from a first position to a second position relative to the base;

a fixed finger attached to the base, the fixed finger having a first short portion proximate to the base and a first tall portion distal from the base; and a movable finger attached to the movable element and opposed to the fixed finger, the movable finger having a second short portion proximate to the movable element and a second tall portion distal from the movable element so that the movable element is pulled toward the base when an electric potential is applied between the fixed finger and the movable finger, wherein a portion of the first tall portion overlaps at least a portion of the second tall portion when the movable element is in a first stable position.

19. The electrostatic comb drive of claim 17 wherein the first tall portion is at least three times as high as the first short portion and the second tall portion is at least twice as high as the second short portion.

* * * * *